(No Model.)
J. W. HANNEGAN.
STUMP PULLER.
No. 580,043. Patented Apr. 6, 1897.
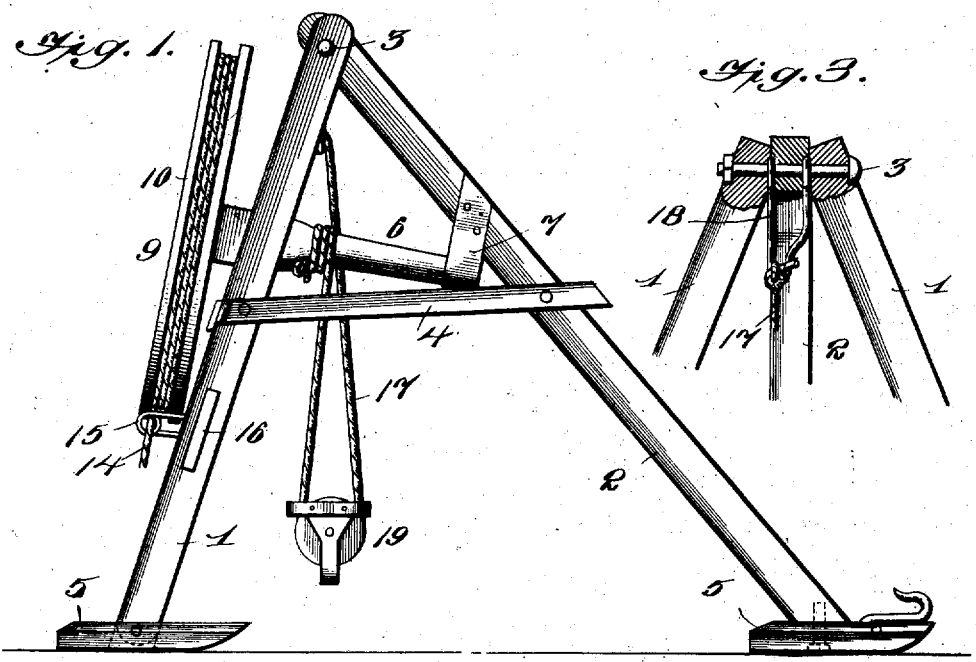
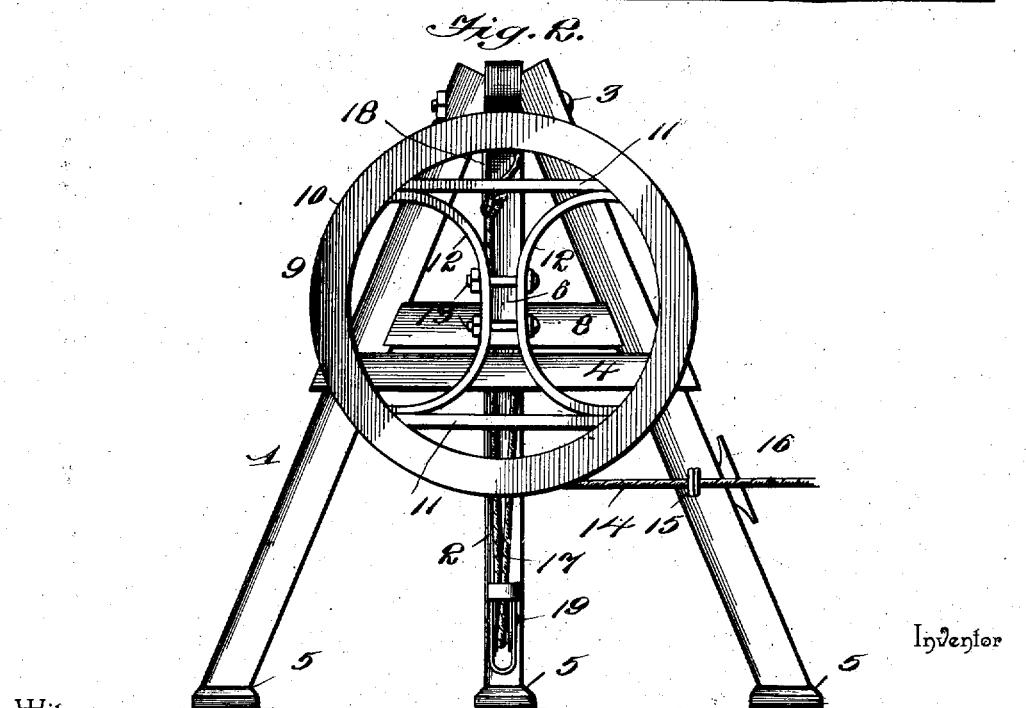
Witnesses
H. J. Koerth
V. B. Hillyard
By his Attorneys,
C. A. Snow & Co.
Inventor
John W. Hannegan

UNITED STATES PATENT OFFICE.

JOHN W. HANNEGAN, OF HERSEY, WISCONSIN

STUMP-PULLER.

SPECIFICATION forming part of Letters Patent No. 580,043, dated April 6, 1897.

Application filed March 26, 1896. Serial No. 584,942. (No model.)

*To all whom it may concern:*

Be it known that I, JOHN W. HANNEGAN, a citizen of the United States, residing at Hersey, in the county of St. Croix and State of Wisconsin, have invented a new and useful Stump-Puller, of which the following is a specification.

This invention relates to grubbing and stump-extracting machines, and has for its object to provide a simple and effective device for this purpose, which can be economically constructed, occupy a minimum amount of space, capable of operating close to a fence or wall, and which will be stable and perform the work in a satisfactory manner.

The invention consists of the novel features and details of construction which hereinafter will be more fully described and claimed and which are shown in the accompanying drawings, in which—

Figure 1 is a side elevation of a stump-extractor constructed in accordance with this invention. Fig. 2 is a front view thereof. Fig. 3 is a detail view showing the manner of connecting the upper ends of the frame-bars and the clevis, to which one end of the extracting-rope is attached.

Corresponding and like parts are referred to in the following description and indicated in the several views of the drawings by the same reference-characters.

The frame comprises an A-stanchion 1 and a rear stay 2, the oppositely-inclining bars coming together at their upper ends and being secured by a single horizontal bolt or fastening 3. Horizontal braces 4 connect the frame-bars intermediate of their ends and serve to strengthen and give stability to the structure. Shoes 5 have loose or pivotal connection with the lower ends of the frame-bars and support the device when skidding it from one place to another. These shoes also subserve another useful purpose, inasmuch as they secure an extended bearing upon the ground and prevent the lower ends of the frame-bars from sinking into the soil when the latter is soft or marshy.

A shaft 6 obtains a bearing at its inner end in a hanger or stirrup 7, secured to the rear stay 2, and is mounted near its front end in a bearing provided on a cross-bar 8 of the A-stanchion, and this shaft inclines to the horizontal, and its active portion, or that part comprised between the front and rear bearings, is made tapering to decrease the leverage proportionate to the increase of the load, whereby the uprooting of a stump is effected by the application of a practically uniform and even force. The front end of the shaft projects beyond the A-stanchion, and a power-wheel 9 is secured thereto. This power-wheel is about five or six feet in diameter to secure ample leverage, and inclines from the perpendicular proportionate to the declination of the shaft 6 from the horizontal, thereby enabling the said power-wheel to approximate the slant of the A-stanchion, so that the extractor can be used close against a fence or wall. By inclining the power-wheel and shaft the structure is prevented from toppling over when subjected to strain, and the device is rendered more stable.

The power-wheel comprises a grooved rim 10, straight parallel braces 11, forming chords of the circle corresponding to the inner periphery of the rim, and oppositely-disposed C-braces 12, located between the braces 11 and having their terminal portions rigidly secured thereto and abutting against the inner periphery of the rim. The middle parts of the C-braces are spaced a short distance from one another and receive the flattened end of the shaft 6 between them and are connected and clamped against the sides of the front end of the shaft by bolts or like fastenings 13. By loosening the bolts 13 the power-wheel can be removed, and by constructing the braces 12 in substantially a C form and locating them between chord-braces 11 the power can be transmitted from the rim 10 to the shaft without straining or dismembering the wheel. The rope 14 is attached at one end to the power-wheel and is wound about the rim thereof, being seated in the groove and passing through a guide 15. A cleat 16 is provided on a bar of the A-stanchion adjacent to the guide 15 to receive a hitch of the rope 14 when snubbing it to retain the stump in an elevated position.

The extracting-rope 17 is secured at one end to the shaft 6, contiguous to the front bearing, and its opposite end is knotted and engaged with the contracted end of a clevis 18, secured to the bolt or fastening 3, the upper portion of the clevis being expanded to admit of the knotted end of the rope passing freely therethrough when it is required to release or connect the rope 17 with the clevis. A pulley-block 19 is supported in the bight of the rope 17, and the grapple or other part applied to the stump or grub to be extracted is secured to the pulley-block 19 in the usual way. After the device has been placed in position and a stump hitched to the pulley-block 19 draft is applied to the rope 14 by hitching a team thereto and the rope is unwound from the power-wheel, thereby turning the shaft 6 and winding the rope 17 thereon and uprooting the stump or grub, as will be readily understood. The declination of the shaft 6, as well as its tapering form, causes the winds of the rope to lie side by side and follow the length of the shaft, as will be readily understood.

Having thus described the invention, what is claimed as new is—

In a stump-extractor, the combination of a frame, a shaft journaled to the frame and having flattened sides at its outer end, an extracting-rope having connection with the shaft, a grooved rim, parallel braces forming chords of the rim, oppositely-disposed C-braces located between the parallel chord-braces and secured to the latter, and having their terminals abutting against the rim, means for clamping the middle parts of the C-braces against the flattened sides of the shaft, and a rope secured at one end to the rim and wound about the latter and adapted to have the power applied thereto, substantially as and for the purpose set forth.

In testimony that I claim the foregoing as my own I have hereto affixed my signature in the presence of two witnesses.

JOHN W. HANNEGAN.

Witnesses:
J. A. DECKER,
ALEXANDRA SANGESTAD.